Patented Jan. 25, 1944

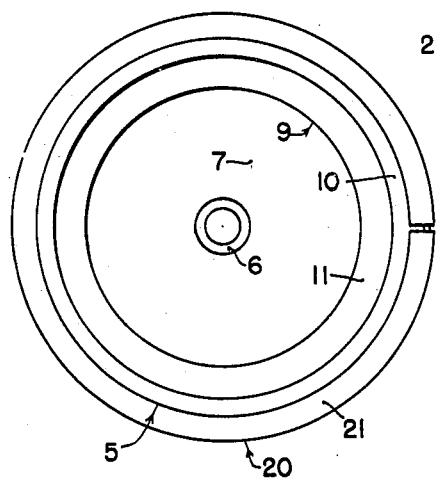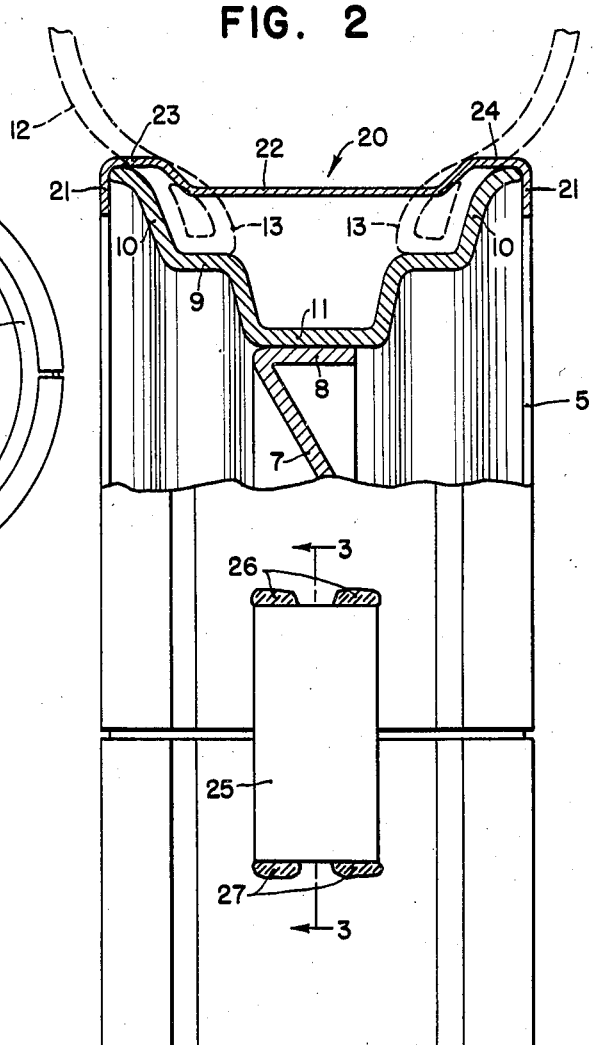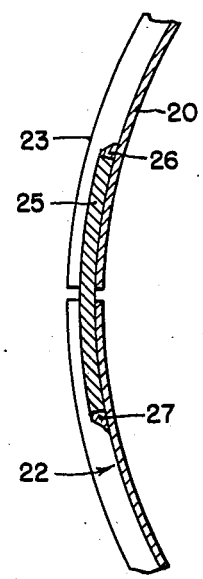

2,340,105

UNITED STATES PATENT OFFICE 2,340,105

WHEEL

Theophilus Brown, Moline, and Maurice J. Martens, East Moline, Ill., assignors to Deere & Company, Moline, Ill., a corporation of Illinois Application August 29, 1941, Serial No. 408,802

4 Claims. (Cl. 301—39)

The present invention relates generally to wheels and more particularly to temporary guard rims for use over the rims of wheels which are normally equipped with pneumatic tires.

Most modern farm implements and trailers are supported on rubber tired wheels of the drop-center type, but in some cases it is desirable to ship the implements and trailers without tires on the wheels. This practice sometimes causes damage to the rims when moving the implements, and also causes the rims to spread due to the heavy weight on the latter even when the implement is standing stationary.

The principal object of the present invention, therefore, is to provide a temporary guard rim which can be mounted over the rim of the wheel and on which the latter can roll to prevent it from spreading the bead flanges and to protect the paint on the rims.

Other objects and advantageous features of our invention will become apparent to those skilled in the art after consideration of the following detailed description of the preferred embodiment thereof, reference being had to the accompanying drawing, in which Figure 1 is a side view of a wheel having a temporary guard rim mounted thereon which is constructed according to the principles of our invention;

Figure 2 is an enlarged front view, partially sectioned, of the same; and

Figure 3 is a section on the line 3—3 of Figure 2.

Referring now to the drawing, the wheel is indicated in its entirety by the reference numeral 5 and is of conventional construction comprising a hub 6 which is fixed in the center of a conical disk 7. The outer peripheral edge of the disk 7 is turned over to form a cylindrical flange 8 which is adapted to fit within a drop center tire rim 9 and is welded thereto in the usual manner.

The tire rim 9 is a conventional drop center rim having bead flanges 10 and a depressed central portion 11 to facilitate changing tires. Figure 2 shows in broken lines the manner in which a pneumatic tire, indicated at 12, is mounted on the rim 9 with the beads 13 thereof bearing outwardly against the bead flanges 10.

When the implement on which the wheel 5 is mounted is to be shipped without the tire 12 on the rim 9, a temporary guard rim which is indicated generally by the reference numeral 20 is mounted over the rim 9 to prevent the bead flanges 10 from spreading under the weight of the implement, and to protect the paint on the flanges.

The temporary guard rim 20 is preferably in the form of a split circular band of heavy gauge sheet metal which is rolled to the desired shape. The outer edges of the rim 20 are bent radially inwardly to form flanges 21 which fit snugly down over the outside edges of the bead flanges 10 to hold the latter against spreading. The central portion of the guard rim is depressed at 22, leaving shoulders 23 and 24 which engage the ground and which are supported from underneath by the bead flanges 10.

In mounting the guard rim 20 on the wheel rim 9, the ends of the guard rim are spread apart to get the flanges 21 over the bead flanges 10. When the guard rim has been properly placed on the wheel, the ends thereof are drawn tightly together and are joined by a strap 25 which is disposed within the recessed portion 22 and is tack-welded thereto at 26 and 27. The thickness of the strap 25 is appreciably less than the depth of the recess 22 so that the strap is prevented from contacting the ground, which might cause the welds to break.

The guard rim is removed from the wheel by breaking either set of welds 26 or 27 with a cold chisel or with sharp blows of a hammer and to this end the welds are applied in small patches as shown in Figure 2, so that they can readily be broken, yet at the same time have ample strength for holding the ends of the temporary rim together under ordinary use. A continuous band of wire or strap steel might be passed around the guard rim in the recessed portion 22 thereof in place of the welded strap 25 for the purpose of clamping the rim to the wheel, although we have found from experience that the welded strap connection provides the strongest and, at the same time, cheapest joint.

One advantageous feature of our invention is that the temporary guard rim may be thrown away when it has served its purpose since the cost is so low that the return shipping charges would, in most cases, exceed the value of the rim.

What we claim as our invention and desire to secure by Letters Patent is:

1. The combination with a pneumatic tire rim having laterally spaced generally radially outwardly extending divergent flanges, of a guard rim comprising a sheet metal band adapted to embrace said tire rim and overlie the peripheral edges of said flanges, and a pair of narrow flanges on said guard rim extending radially inwardly along the outsides of the tire rim flanges to prevent the same from spreading.

2. The combination with a tire rim having radially outwardly extending bead flanges adapted to receive the beads of a pneumatic tire, a temporary detachable guard rim for protecting said flanges when the tire is removed, said guard rim comprising a split circular sheet metal band adapted to fit around the outer periphery of said tire rim and to overlie said radial flanges, said band having flange portions extending radially inwardly along the outsides of the tire rim flanges to grip the latter and prevent them from spreading, and a peripheral securing strap engageable with the guard rim to hold the latter in position, said band having a central depression for receiving said strap to dispose the latter inwardly of the outer periphery of the guard rim.

3. The combination with a tire rim having radially outwardly extending laterally spaced bead flanges adapted to receive the beads of a pneumatic tire, a temporary guard rim for protecting said flanges when the tire is removed, said guard rim comprising a split circular sheet metal band adapted to fit around the outer periphery of said tire rim and to overlie said radial flanges, said band having a recess formed therein adapted to be between the bead flanges of the tire rim, a securing strap disposed within said recess overlying the adjacent ends of the guard rim, said strap being temporarily fixed to at least one of said ends of the guard rim by a joint capable of being ruptured by a cold chisel or by hammering to permit removal of the guard rim from the tire rim.

4. The combination with a pneumatic rim of the drop center type having laterally spaced generally radially outwardly extending divergent tire-engaging flanges, of a detachable guard rim for protecting said rim when the tire is removed, comprising a split circular band adapted to fit around the outer periphery of said tire rim and to overlie said radial flanges and having radially inwardly extending marginal flanges adapted to engage the laterally outer edge portions of said divergent flanges, said marginal flanges being relatively narrow so as to accommodate said guard rim being sprung outwardly at the split section thereof so as to be disposable over said tire rim flanges.

THEOPHILUS BROWN.
MAURICE J. MARTENS.